United States Patent
Yin et al.

(10) Patent No.: US 11,194,088 B2
(45) Date of Patent: Dec. 7, 2021

(54) FILL-IN LIGHT UNIT, DISPLAY SCREEN, DISPLAY APPARATUS, AND TERMINAL

(71) Applicant: Huawei Technologies Co., Ltd., Shenzhen (CN)

(72) Inventors: Bangshi Yin, Shenzhen (CN); Kangle Xue, Shenzhen (CN); Bin Yan, Shenzhen (CN); Jiuliang Gao, Shenzhen (CN); Jun Ding, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/263,698

(22) PCT Filed: Jul. 28, 2018

(86) PCT No.: PCT/CN2018/097709
§ 371 (c)(1),
(2) Date: Jan. 27, 2021

(87) PCT Pub. No.: WO2020/024089
PCT Pub. Date: Feb. 6, 2020

(65) Prior Publication Data
US 2021/0294015 A1    Sep. 23, 2021

(51) Int. Cl.
*G06F 1/16* (2006.01)
*F21V 8/00* (2006.01)
*G02B 3/08* (2006.01)

(52) U.S. Cl.
CPC ............ *G02B 6/0051* (2013.01); *G02B 3/08* (2013.01); *G02B 6/0055* (2013.01)

(58) Field of Classification Search
None
See application file for complete search history.

(56) References Cited

U.S. PATENT DOCUMENTS

| 2006/0251377 | A1 | 11/2006 | Uemoto | |
|---|---|---|---|---|
| 2007/0097296 | A1* | 5/2007 | Li | G02B 6/0063 349/114 |
| 2007/0206137 | A1* | 9/2007 | Akiyama | G02B 6/0038 349/113 |
| 2008/0304286 | A1* | 12/2008 | Iwasaki | G02B 6/0068 362/612 |
| 2011/0050658 | A1 | 3/2011 | White et al. | |

(Continued)

FOREIGN PATENT DOCUMENTS

| CN | 1862341 A | 11/2006 |
|---|---|---|
| CN | 101251674 A | 8/2008 |
| CN | 102478676 A | 5/2012 |

(Continued)

*Primary Examiner* — Elmito Breval
(74) *Attorney, Agent, or Firm* — Conley Rose, P.C.

(57) ABSTRACT

A display screen includes a display panel, a back light system, and an optical device concealed under the display panel, where a transmission light path formed by light rays received or transmitted by the optical device passes through the display screen. The display screen includes the fill-in light system, where the fill-in light system is disposed between the back light system and the optical device. The fill-in light system includes a first light source and a light guide member configured to transmit a light ray emitted by the first light source.

20 Claims, 6 Drawing Sheets

(56) References Cited

U.S. PATENT DOCUMENTS

2015/0316699 A1    11/2015  Shimizu

FOREIGN PATENT DOCUMENTS

| CN | 102483897 A | 5/2012 |
| CN | 203963688 U | 11/2014 |
| CN | 105190153 A | 12/2015 |
| CN | 107272242 A | 10/2017 |
| CN | 207352317 U | 5/2018 |
| CN | 108108718 A | 6/2018 |

* cited by examiner

FILL-IN LIGHT UNIT, DISPLAY SCREEN, DISPLAY APPARATUS, AND TERMINAL

CROSS-REFERENCE TO RELATED APPLICATIONS

This application is a U.S. National Stage of International Patent Application No. PCT/CN2018/097709 filed on Jul. 28, 2018, which is hereby incorporated by reference in its entirety.

TECHNICAL FIELD

This application relates to the field of display technologies, and in particular, to a fill-in light unit, a display screen, a display apparatus, and a terminal.

BACKGROUND

Under the trend of full-screen mobile phones, various optical devices on front faces of mobile phones tend to develop to under-screen optical devices. When a liquid crystal display (LCD) is used in an electronic device such as a mobile phone, the LCD includes a stacked display panel 1 and a back light unit (BLU). Due to a complex structure (including a film layer 2, a light guide plate and dots thereon, a reflection layer 4, and an iron frame 3 in sequence from top to bottom) of a back light unit, quality of an optical device (such as an ambient light sensor, a proximity light sensor, a camera, and a fingerprint sensor) is dramatically degraded. To enable an optical device to be used under an LCD screen, various membrane materials in a light path of the optical device need to be bored or adjusted, to eliminate micro structures in the light path, so that the light path is adjusted based on an established rule. Usually, a film layer 2, a reflection layer 4, and an iron frame 3 in a BLU need to be bored to avoid a light path. However, when the foregoing method is used, a black hole inevitably appears at a position corresponding to the optical device on the liquid crystal display. Consequently, a display effect of the liquid crystal display is affected.

SUMMARY

This application provides a fill-in light unit, a display screen, a display apparatus, and a terminal, to improve a display effect of a display screen.

According to a first aspect, a display screen is provided. The display screen includes a display panel and a back light unit configured to provide a light source for the display panel, and further includes an optical device hidden under the display panel. The optical device is an optical device that needs to emit a light ray or receive a light ray, for example, an infrared sensor or an infrared camera. To enable a light ray that can be received or emitted by the optical device to pass through the display screen, during specific disposition, a transmission light path formed by received light or emitted light of the optical device passes through the display panel and the back light unit. To alleviate a black hole, a fill-in light unit is further provided in this application. The fill-in light unit is disposed between the back light unit and the optical device. The transmission light path passes through the fill-in light unit. Specifically, the fill-in light unit includes a first light source and a light guide member configured to transmit a light ray emitted by the first light source. The transmission light path passes through the light guide member. The light guide member diffuses or condenses the light ray emitted by the first light source into the transmission light path. When display of the display screen is viewed, because the disposed light guide member transmits the light ray emitted by the first light source to the transmission light path, a brightness difference between the transmission light path and another region on the display screen is reduced, thereby further improving a display effect of the display screen.

During a specific implementation of transmitting the light ray emitted by the first light source, the light guide member may be a different light guide member. For example, the light guide member is a light guide member that condenses or diffuses the light ray emitted by the first light source, and in a specific implementation solution, the light guide member is a condensing lens or a diffusing lens. More specifically, the light guide member may be a Fresnel lens. Certainly, the light guide member may alternatively be a flat lens.

During specific disposition of the Fresnel lens, the Fresnel lens may be a Fresnel lens having a refraction surface on one side or refraction surfaces on both sides. For example, a surface of the Fresnel lens facing the back light unit is a Fresnel refraction surface, or surfaces of the Fresnel lens facing and away from the back light unit are both Fresnel refraction surfaces. Therefore, the light ray emitted by the first light source can be better transmitted to the transmission light path.

The Fresnel refraction surface may be specifically formed in various manners. For example, a surface of the Fresnel lens facing the back light unit is provided with a plurality of concentric circular grooves or a plurality of straight grooves arranged in parallel. Alternatively, two panels of the Fresnel lens facing and away from the back light unit are each provided with a plurality of concentric circular grooves or a plurality of straight grooves arranged in parallel. In this way, the Fresnel refraction surface is formed by using different structures. Moreover, a surface of the Fresnel lens forming the Fresnel refraction surface may be a convex surface or a concave surface.

Moreover, in addition to the foregoing Fresnel lens, the light guide member may alternatively have the following structure: A plurality of triangular protrusions are disposed on a surface of a side of the light guide member facing the back light unit. That is, the light guide member is an array formed by triangular lenses, and a light ray condensing effect or a light diffusing effect also can be achieved.

In a specific implementation solution, the fill-in light unit further includes a film layer, the film layer is disposed on a side of the light guide member away from the back light unit, and the film layer is a film layer capable of transmitting a first light ray and reflecting a second light ray, where the first light ray is the received light or the emitted light of the optical device, and the second light ray is the light ray emitted by the first light source. In this way, the fill-in light unit may transmit a light ray that the optical device requires.

To improve a light filling effect, the fill-in light unit further includes a first reflection layer disposed on a side of the light guide member away from the back light unit, the first reflection layer is provided with a first through hole, the film layer is disposed inside the first through hole, and the transmission light path passes through the first through hole and the film layer.

In a specific implementation solution, a quantity of the first light sources is two, and the two first light sources are symmetrically disposed on two sides of the light guide member. During specific disposition of the two first light sources, an angle between an axis of emitted light of the first light source and an axis of the light guide member is a specified angle. For example, an angle between light emitting axes of the two first light sources and an optical axis of the light guide member is a right angle or an acute angle.

The back light unit includes: a light guide plate, a second light source disposed on a side of the light guide plate, and a second reflection layer disposed on a side of the light guide plate away from the display panel, where the second reflection layer is provided with a second through hole, and the transmission light path passes through the light guide plate and the second through hole provided in the second reflection layer.

To simplify an overall structure, the light guide member and the light guide plate are an integral structure, the first light source and the second light source are an integral structure, and the second reflection layer and the first reflection layer are an integral structure. In this way, it is not needed to dispose an additional fill-in light unit, and a light filling effect can be achieved by improving the structure of the back light unit.

According to a second aspect, a fill-in light unit is provided. The fill-in light unit is applied to a display screen and includes: a first light source configured to emit light and a light guide member configured to transmit a light ray emitted by the first light source, where a light emitting surface of the light guide member faces a back light unit of the display screen. A light ray for light filling is provided through the first light source, and is spread to the back light unit of the display screen through the light guide member. Specifically, the light ray is transmitted to a transmission passage of an optical device in the display screen, to provide the light ray for light filling, thereby reducing a display difference on the display screen, and improving a display effect of the display screen.

During a specific implementation of transmitting the light ray emitted by the first light source, the light guide member may be a different light guide member. For example, the light guide member is a light guide member that condenses or diffuses the light ray emitted by the first light source, and in a specific implementation solution, the light guide member is a condensing lens or a diffusing lens. More specifically, the light guide member may be a Fresnel lens. Certainly, the light guide member may alternatively be a flat lens.

During specific disposition of the Fresnel lens, the Fresnel lens may be a Fresnel lens having a refraction surface on one side or refraction surfaces on both sides. For example, a surface of the Fresnel lens facing the back light unit is a Fresnel refraction surface, or surfaces of the Fresnel lens facing and away from the back light unit are both Fresnel refraction surfaces. Therefore, the light ray emitted by the first light source can be better transmitted to the transmission light path.

In a specific implementation solution, the fill-in light unit further includes a film layer, the film layer is disposed on a side of the light guide member away from the back light unit, and the film layer is a film layer capable of transmitting a first light ray and reflecting a second light ray, where the first light ray is received light or emitted light of the optical device in the display screen, and the second light ray is the light ray emitted by the first light source. In this way, the fill-in light unit may transmit a light ray that the optical device requires.

To improve a light filling effect, the fill-in light unit further includes a first reflection layer disposed on a side of the light guide member away from the back light unit, the first reflection layer is provided with a first through hole, the film layer is disposed inside the first through hole, and the transmission light path passes through the first through hole and the film layer.

In a specific implementation solution, a quantity of the first light sources is two, and the two first light sources are symmetrically disposed on two sides of the light guide member. During specific disposition of the two first light sources, an angle between an axis of emitted light of the first light source and an axis of the light guide member is a specified angle. For example, an angle between light emitting axes of the two first light sources and an optical axis of the light guide member is a right angle or an acute angle.

According to a third aspect, a display apparatus is provided, including the display screen according to any one of the foregoing aspects.

In the foregoing technical solutions, when display of the display screen is viewed, because the disposed light guide member transmits the light ray emitted by the first light source to the transmission light path, a brightness difference between the transmission light path and another region on the display screen is reduced, thereby further improving a display effect of the display screen.

According to a fourth aspect, a terminal is provided, including the display screen according to any one of the foregoing.

In the foregoing technical solutions, when display of the display screen is viewed, because the disposed light guide member transmits the light ray emitted by the first light source to the transmission light path, a brightness difference between the transmission light path and another region on the display screen is reduced, thereby further improving a display effect of the display screen.

DESCRIPTION OF EMBODIMENTS

To make the objectives, technical solutions, and advantages of this application clearer, the following further describes this application in detail with reference to the accompanying drawings.

To facilitate understanding of a fill-in light unit provided in the embodiments of this application, the following first describes an application scenario of the fill-in light unit provided in the embodiments of this application. The fill-in light unit is applied to a display screen. The display screen may be applied to a mobile terminal, a notebook computer, or another communication device.

To facilitate understanding of the fill-in light unit provided in the embodiments of this application, the following describes structures and working principles of the fill-in light unit and the display screen provided in the embodiments of this application with reference to an application of the fill-in light unit on the display screen.

Figure 1:
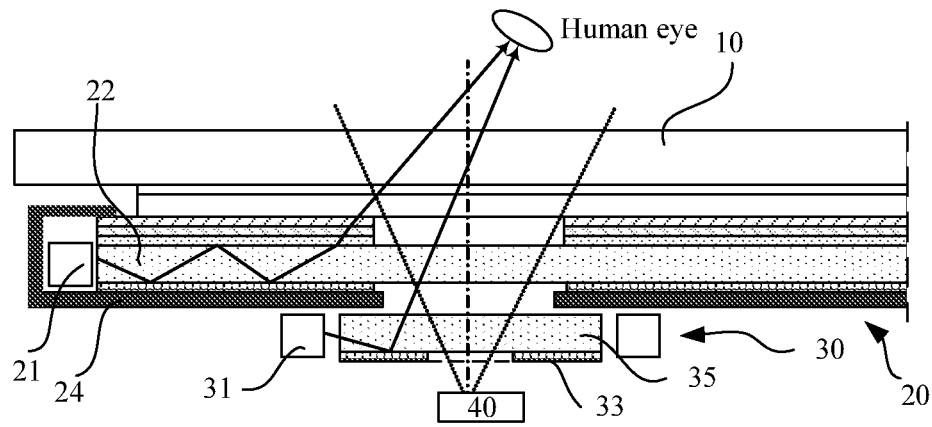
FIG. 1 is a schematic structural diagram of a display screen according to an embodiment of this application.
Figure 2:
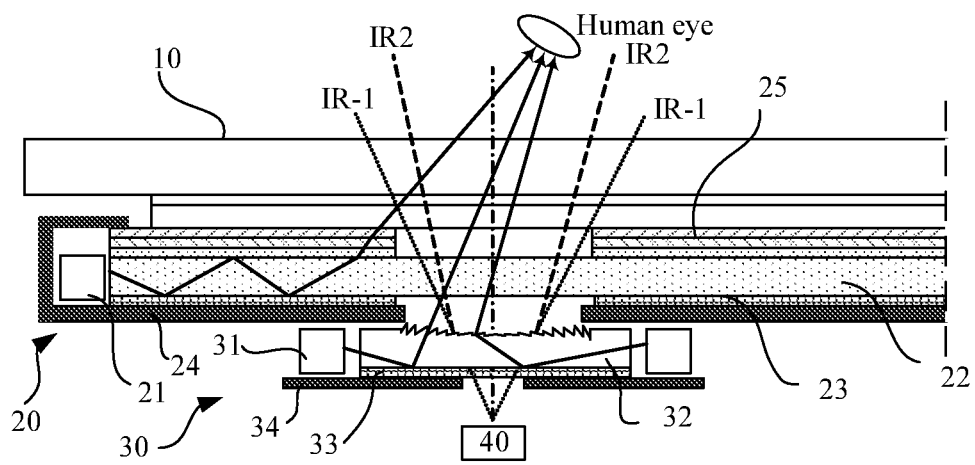
FIG. 2 is a schematic structural diagram of a display screen according to an embodiment of this application.

As shown in FIG. 1 and FIG. 2, in the display screen provided in this embodiment of this application, to increase a display area of the display screen, an optical device is disposed in a buried manner, and a structure in which a transmission light path that is formed by received light or emitted light of the optical device passes through the display screen is used to implement a function of the optical device. The optical device may be different optical devices such as an infrared sensor 40 or an infrared camera. In the display screen shown in FIG. 1 and FIG. 2, the infrared sensor 40 is used as an example for description.

During specific arrangement of the display screen, the display screen includes structures shown in FIG. 2, that is, a display panel 10, a back light unit 20, a fill-in light unit 30, and an infrared sensor 40. The display panel 10 and the back light unit 20 are disposed in a stacked manner. The display panel 10 is disposed on a light emitting side of the back light unit 20. The light emitting side of the back light unit 20 refers to a side of the back light unit 20 from which light rays are emitted. The fill-in light unit 30 is disposed on a side of the back light unit 20 away from the display panel 10. The infrared sensor 40 is disposed on a surface of the fill-in light unit 30 away from the back light unit 20. Still referring to FIG. 1 and FIG. 2, in the display screen provided in this embodiment of this application, a placement direction of the display screen shown in FIG. 1 and FIG. 2 is used as a reference direction. When the foregoing several components are disposed, the display panel 10, the back light unit 20, the fill-in light unit 30, and the infrared sensor 40 are disposed in sequence from top to bottom in a vertical direction. Further, to enable the infrared sensor 40 to receive an external infrared signal, a light transmission structure configured to transmit received light of the infrared sensor 40 is disposed on the display panel 10, the back light unit 20, and the fill-in light unit 30 of the display screen. However, the disposed light transmission structure may cause an adverse effect of forming a black hole during display of the display screen. To reduce impact on display of the display screen, in this embodiment of this application, a display effect of the display screen is improved by using the fill-in light unit 30.

To facilitate understanding of a principle of the fill-in light unit 30, a transmission light path is first described. In this embodiment of this application, a transmission light path formed by received light of the infrared sensor 40 passes through partial structures of the display panel 10, the back light unit 20, and the fill-in light unit 30.

As shown in FIG. 2, the display panel 10 provided in this embodiment of this application is a display panel in the prior art. The display panel 10 includes, but is not limited to, upper and lower polarizers, a color filter substrate, an array substrate, and a liquid crystal molecule layer filled between the color filter substrate and the array substrate. Because the display panel 10 is light-transmitting, light rays may be directly incident on or directly emerge from the display panel 10.

For the back light unit 20 provided in this embodiment of this application, as shown in FIG. 2, the back light unit 20 shown in FIG. 2 is a back light unit using a side light source. However, it should be understood that the back light unit 20 provided in this embodiment of this application is not limited to the back light unit 20 shown in FIG. 2, and may alternatively be a back light unit using a straight light source. In this embodiment of this application, the back light unit 20 using a side light source is used as an example for description. To facilitate description of structures that are disposed on the back light unit 20 and through which a transmission light path passes, the following first describes a structure of the back light unit 20. Still referring to FIG. 2, the back light unit 20 includes a light guide plate 22 and second light sources 21 disposed on two sides of the light guide plate 22. Because the back light unit 20 is a symmetric structure, FIG. 2 shows only a structure of one side of the back light unit. The back light unit 20 further includes a second reflection layer 23 disposed on a side of the light guide plate 22 away from the display panel 10. The light guide plate 22 in the back light unit 20 is a light transmission component. Therefore, to enable the back light unit 20 to transmit light, a through hole is provided in the second reflection layer 23 of the back light unit 20. The through hole may be defined as a second through hole. The structures, through which the transmission light path passes, on the back light unit 20 include the light guide plate 22 and the second through hole. Certainly, if the back light unit 20 includes a frame 24 and a film layer 25, the frame 24 and the film layer 25 (a prism film, a light equalizing film, or the like) are also provided with through holes. The transmission light path also passes through the frame 24 and the film layer 25 through the through holes.

Referring to FIG. 1 and FIG. 2 together, for the fill-in light unit 30 provided in this embodiment of this application, the fill-in light unit 30 is a component disposed in the display screen provided in this embodiment of this application, to improve a display effect of the display screen, and includes a first light source 31 and a light guide member configured to transmit a light ray emitted by the first light source 31. A light emitting surface of the light guide member faces the back light unit 20 of the display screen. The light emitting face of the light guide member refers to a surface from which light ray emitted by the first light source 31 is emitted from the light guide member. Specifically, the light guide member is configured to transmit a light ray emitted by the first light source 31 to a transmission light path, to alleviate a black hole effect formed by disposing an optical device. In addition, a transmission light path formed by received light of the infrared sensor 40 passes through the light guide member in the fill-in light unit 30.

In this embodiment of this application, different light guide members may be configured to transmit a light ray emitted by the first light source 31. As shown in FIG. 1, the light guide member is a flat lens 35. The flat lens does not have any light condensation or diffusion effect. Alternatively, as shown in FIG. 2, the light guide member may be a light guide member that condenses or diffuses a light ray emitted by the first light source 31 into the transmission light path. In this case, classified based on functions, the light guide member may be a condensing lens or a diffusing lens. The several light guide members exemplified above may all be applied to the fill-in light unit 30 provided in this embodiment of this application. Several specific light guide members, for example, a Fresnel lens 32, a triangular lens, a convex lens, and a concave lens, are exemplified below.

Figure 3A:
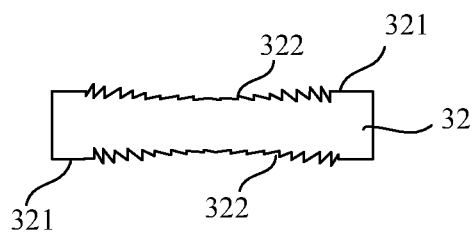
FIG. 3a to FIG. 3h are schematic structural diagrams of a Fresnel lens according to an embodiment of this application.
Figure 3B:
Figure 3C:
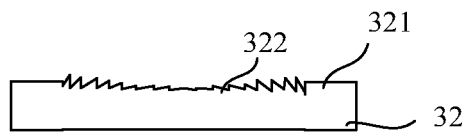
Figure 3D:
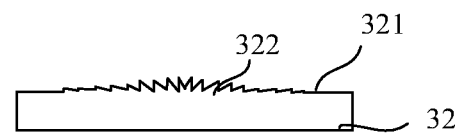
Figure 3E:
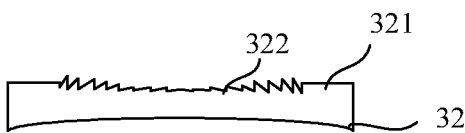
Figure 3F:
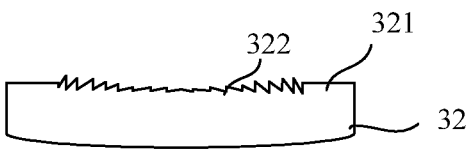
Figure 3G:
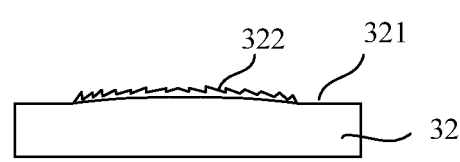
Figure 3H:
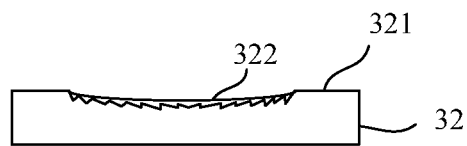

Descriptions are provided below by using the Fresnel lens 32 as an example. Fresnel lenses of different structures may be used as the Fresnel lens 32 provided in this embodiment of this application. For example, a surface of the Fresnel lens 32 facing the back light unit 20 is a Fresnel refraction surface 321, or surfaces of the Fresnel lens 32 facing and away from the back light unit 20 are both Fresnel refraction surfaces 321. The Fresnel refraction surface 321 is formed by forming a Fresnel texture 322 on a surface of the Fresnel lens 32. Referring to FIG. 3a to FIG. 3h together, FIG. 3a to FIG. 3h show a variety of different Fresnel lenses 32 having the Fresnel texture 322. FIG. 3a shows that a surface of the Fresnel lens 32 facing the back light unit 20 and a surface of the Fresnel lens 32 away from the back light unit 20 are separately provided with the Fresnel texture 322. Moreover, for structures shown in FIG. 3b to FIG. 3h, a surface of the Fresnel lens 32 facing the back light unit 20 is provided with the Fresnel texture 322. In addition, when the Fresnel texture is formed, a surface of the Fresnel lens 32 may be a flat surface or a curved surface. As shown in FIG. 3a, two surfaces of the Fresnel lens 32 that are provided with the Fresnel textures are concave curved surfaces. The surfaces that are provided with the Fresnel textures in FIG. 3b and FIG. 3c are also concave curved surfaces. A surface of the Fresnel lens 32 that is provided with the Fresnel texture in FIG. 3d is a convex curved surface. Moreover, for FIG. 3e and FIG. 3f, in FIG. 3e, a surface that is provided with the Fresnel texture is a flat surface, and a surface away from the back light unit 20 is a concave curved surface, and in FIG. 3f, a surface that is provided with the Fresnel texture 322 is a flat surface, and a surface away from the back light unit 20 is a convex curved surface. Moreover, for FIG. 3g and FIG. 3h, the Fresnel texture 322 and the light guide member are not an integral structure, and instead, the light guide member is provided with the Fresnel texture 322 to form the Fresnel lens 32.

Figure 4:
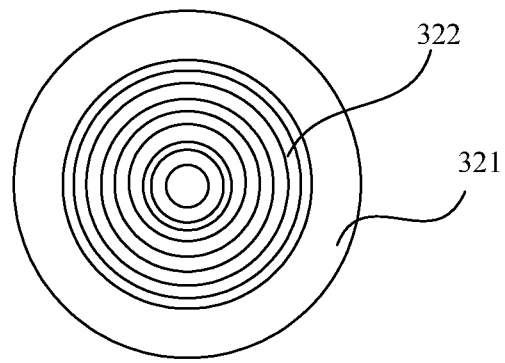
FIG. 4 is a top view of a Fresnel lens according to an embodiment of this application.
Figure 5:
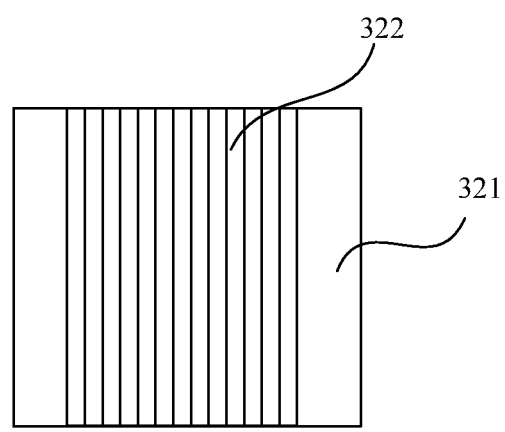
FIG. 5 is a top view of another Fresnel lens according to an embodiment of this application.

In addition, when the Fresnel texture 322 is specifically disposed, the Fresnel texture 322 does not need to condense or diffuse light from all directions in a same way. Viewed in a direction of directly facing the Fresnel texture 322, the Fresnel texture 322 may be centrosymmetric or bilaterally symmetrical, depending on specific requirements. For example, the Fresnel texture 322 of the Fresnel lens 32 may be concentric rings, parallel lines, or other regular patterns. A difference between the textures lies in that light rays are refracted centrosymmetrically or only light from one direction or more directions is refracted. Specifically, as shown in FIG. 4 and FIG. 5, FIG. 4 shows a structure in which the Fresnel texture is centrosymmetric. In this case, the Fresnel refraction surface 321 is provided with a plurality of concentric circular grooves, and the plurality of concentric circular grooves form the Fresnel texture 322. In a structure shown in FIG. 5, the Fresnel texture 322 is bilaterally symmetrical. In this case, the Fresnel refraction surface 321 is provided with a plurality of straight grooves arranged in parallel. The Fresnel texture 322 includes the plurality of straight grooves. Moreover, a shape of the Fresnel lens 32 in the fill-in light unit 30 may be circular or square, depending on specific requirements. The Fresnel lens 32 shown in FIG. 4 is circular, and the Fresnel lens 32 shown in FIG. 5 is rectangular.

Certainly, the light guide member provided in this embodiment of this application is not limited to the foregoing Fresnel lens 32 and may alternatively be another light guide member, for example, a triangular lens. During specific disposition, a surface of the light guide member facing a side of the back light unit 20 is provided with a plurality of triangular protrusions. In this way, a light ray emitted by the first light source 31 may also be irradiated into a transmission passage.

To improve a light effect of the light unit 30, the fill-in light unit 30 provided in this embodiment of this application further includes a film layer 33. The film layer 33 is disposed on a side of the light guide member away from the back light unit 20 (for details, refer to FIG. 2), and the film layer 33 can transmit a first light ray and reflect a second light ray. The first light ray is received light or emitted light of the optical device. Corresponding to the structure shown in FIG. 2, the first light ray is received light of the infrared sensor 40. The second light ray is a light ray emitted by the first light source 31. When the film layer 33 is used, the transmission light path also passes through the film 33. During use, a light ray of the first light source 31 transmitted in the light guide member to a side away from the back light unit 20 may be reflected back through the film layer 33, thereby improving an effect of condensing or diffusing the second light ray into the transmission light path by the light guide member. In addition, when the Fresnel lens 32 is used as the light guide member, and the Fresnel lens 32 is in the structure shown in FIG. 3a, an angle at which the film layer 33 is irradiated may be changed by using the texture 322 in the Fresnel lens 32. In this way, more light rays can enter the transmission light path after being reflected by the film layer 33.

Moreover, the fill-in light unit 30 further includes a first reflection layer 34 disposed on a side of the light guide member away from the back light unit 20. The first reflection layer 34 is provided with a through hole. The film layer 33 is disposed inside the through hole, and the through hole may be defined as a first through hole. It can be learned from FIG. 2 that if the fill-in light unit 30 includes a reflection layer and the film layer 33, the second light ray is reflected through the first reflection layer 34 and the film layer 33. The first light ray is transmitted through the film layer 33. Certainly, alternatively, the film layer 33 and the first reflection layer 34 may be disposed in a stacked manner. In this case, the film layer 33 partially covers the first through hole.

Figure 6:
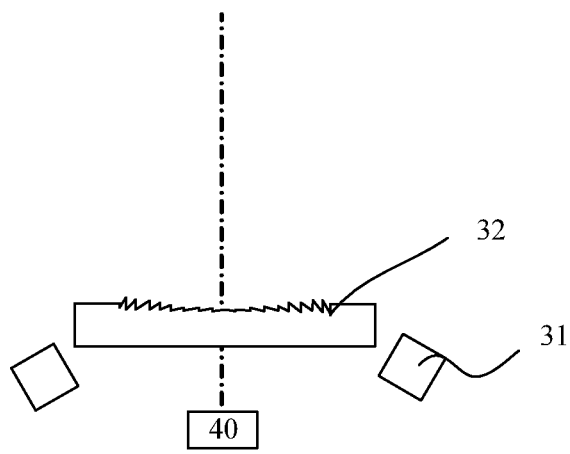
FIG. 6 is a schematic diagram of fitting between a first light source and a light guide member according to an embodiment of this application.

The first light source 31 is configured to emit the second light ray for light compensation. The first light source 31 may be an LED lamp or another common light source. In the embodiment shown in FIG. 2, two first light source 31 are symmetrically disposed on two sides of the light guide member respectively, and a structure thereof is similar to a disposition manner of the second light source 21 in the back light unit 20. In this way, relatively uniform light rays can be provided. However, it should be understood that a disposition manner of the first light source 31 provided in this embodiment of this application is not limited to the structure shown in FIG. 2. Alternatively, an angle between an axis of emitted light of the first light source 31 and an axis of the light guide member may be a specified angle. As shown in FIG. 6, light emitting axes of the two first light sources 31 may alternatively be disposed at an angle of 45° with a light emitting axis of the light guide member.

It can be learned from the foregoing descriptions that the transmission light path passes through: the display panel 10, the light guide plate 22, the second through hole, the light guide member, the film 33, and the first through hole. During specific disposition of the foregoing components, to ensure a transmission effect of a light ray, the first through hole and the second through hole are provided in a manner of using a same axis and a same diameter, and the axis is coaxial with an axis of the optical device. Moreover, for the Fresnel lens 32, when a symmetrical Fresnel texture is used, a symmetric line of the Fresnel lens 32 is collinear with the axis. An area of the Fresnel texture of the Fresnel lens 32 is not less than an area of the first through hole. A manner in which the first through hole, the second through hole, and the Fresnel lens 32 that are described above are disposed is not limited to the foregoing disposition manner, a manner in which the first through hole and the second through hole are disposed in a staggered manner is used. However, it should be ensured that the first through hole and the second through hole that are disposed can transmit the first light ray, and the Fresnel texture 322 provided on the Fresnel lens 32 can also diffuse or condense the second light ray into the transmission light path.

It should be understood that, in the foregoing embodiment, a manner in which a light-proof component through which the transmission light path passes is provided with a through hole is used, to achieve a light transmission effect. However, another manner may alternatively be used. For example, after a through hole is provided, the through hole is filled with a light pipe prepared by using a transparent material (for example, glass or plastic).

Still referring to FIG. 2, in the display screen provided in this embodiment of this application, a display effect of the display screen is improved by transmitting a light ray emitted by the first light source 31 to the transmission light path. Still referring to FIG. 2, there is a Fresnel lens 32 having a structure of the Fresnel texture 322 on an IR central light path (a conical region formed by IR-1 shown in FIG. 2). The Fresnel lens 32 has a regular condensation effect on IR light rays. A conical beam shown by IR-1 in the figure is condensed into a conical beam shown by IR-2 due to existence of the Fresnel lens 32. For light rays emitted by the two first light sources 31, existence of the Fresnel texture 322 leads to occurrence of cases similar to diffused reflection of light ray on an upper surface of the Fresnel lens 32, and there is a light ray on the entire upper surface of the Fresnel lens 32 that can exit and enter human eyes. Due to a feature of tracking light by human eyes, from the perspective of human eyes, an upper surface of the Fresnel lens 32 under conventional backlight is light-emitting, thereby alleviating the problem of a central black hole in the prior art and improving a display effect of the display screen.

Figure 7:
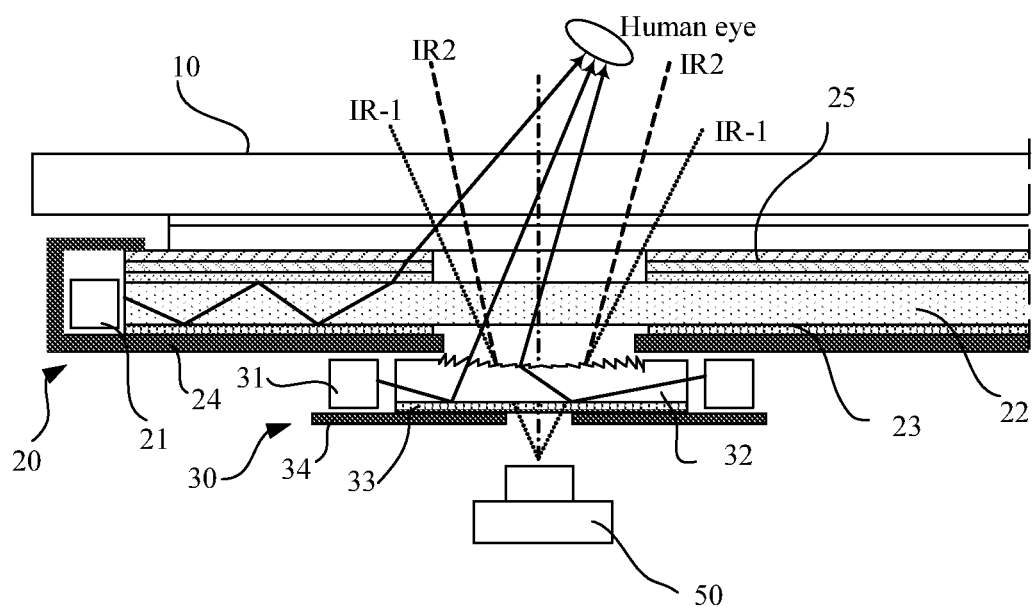
FIG. 7 is a schematic structural diagram of a display screen according to an embodiment of this application.

As shown in FIG. 7, an infrared camera 50 is disposed on a central light path. The infrared camera 50 is hidden below the fill-in light unit 30, and condense infrared signals outside the screen to form an image by using the fill-in light unit 30 and conventional back light. Still referring to FIG. 7, there is still a Fresnel lens 32 having Fresnel texture 322 inside the fill-in light unit 30. For the Fresnel lens 32, the Fresnel texture 322 is equivalent to a light guide member (depending on an actual situation, may be a convex lens or a concave lens by adjusting only a direction of the Fresnel texture 322). In cooperation with the design of a light guide member of the infrared camera 50 and overall assembly tolerance control, infrared signals outside the display screen can be imaged in an expected manner (as shown in IR2). For visible light, a light ray emitted by a first light source 31 is reflected by a first reflection layer 34, and an exiting direction is changed after the light ray is refracted by the Fresnel texture 322, thereby implementing uniform light filling for a central region. Moreover, features of the Fresnel texture 322 shown in FIG. 7 are not substantially different from features of the Fresnel texture 322 shown in FIG. 2. A main difference is that the Fresnel texture 322 in FIG. 7 needs to produce an imaging effect, and therefore, needs to cooperate with the infrared camera 50.

Moreover, in addition to the infrared sensor 40 and the infrared camera 50 that are described above, the optical device may alternatively be an infrared optical fingerprint or an optical device relying on photoelectric conversion of an infrared signal in a specific direction, for example, a proximity light sensor.

Figure 8:
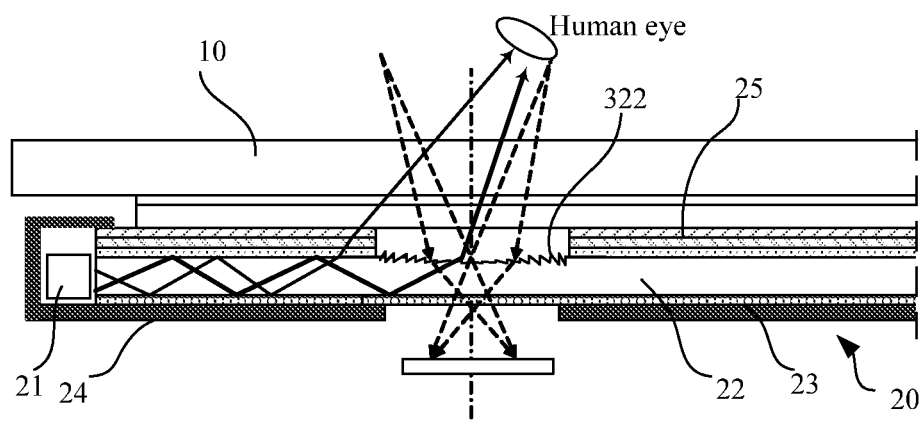
FIG. 8 is a schematic structural diagram of another display screen according to an embodiment of this application.

It can be learned from the foregoing description that, the structure of the fill-in light unit 30 that is provided in this embodiment of this application is similar to the structure of a back light unit 20, both including light sources (a first light source 31 and a second light source 21), conductors transmitting a light ray (a light guide plate 22 in the back light unit 20, and a light guide member in the fill-in light unit 30), and a reflection layer. Therefore, to simplify the overall structure, in another implementation solution of this application, a display screen is formed in a manner in which a light guide member and a light guide plate 22 are an integral structure as shown in FIG. 8, a first light source and a second light source 21 are an integral structure, and a second reflection layer 23 and a first reflection layer are an integral structure. It should be understood that, if the light guide member and the light guide plate 22 are an integral structure, the Fresnel texture 322 is formed on the light guide plate 22. Refer to FIG. 8 for a specific structure. In this way, it is not needed to dispose an additional fill-in light unit, and a light filling effect can be achieved by improving the structure of the back light unit 20. In addition, the thickness of the display screen can be reduced to a large extent. During a specific setting, the Fresnel texture 322 may be directly formed on the light guide plate 22, or the Fresnel texture may be separately formed on a transparent base material first and then bonded to the light guide plate 22. It can be learned from the foregoing description that, when the foregoing structure is used, the light guide plate 22 having a function of a Fresnel lens function can be formed by using the Fresnel texture 322. In addition, light rays can be emitted to a transmission light path by using a light source provided by the second light source 21, thereby alleviating a case in which a black hole occurs, improving a display effect of the display screen, and in addition, effectively reducing the thickness of the display screen, which facilitates the development of thinness.

Figure 9:
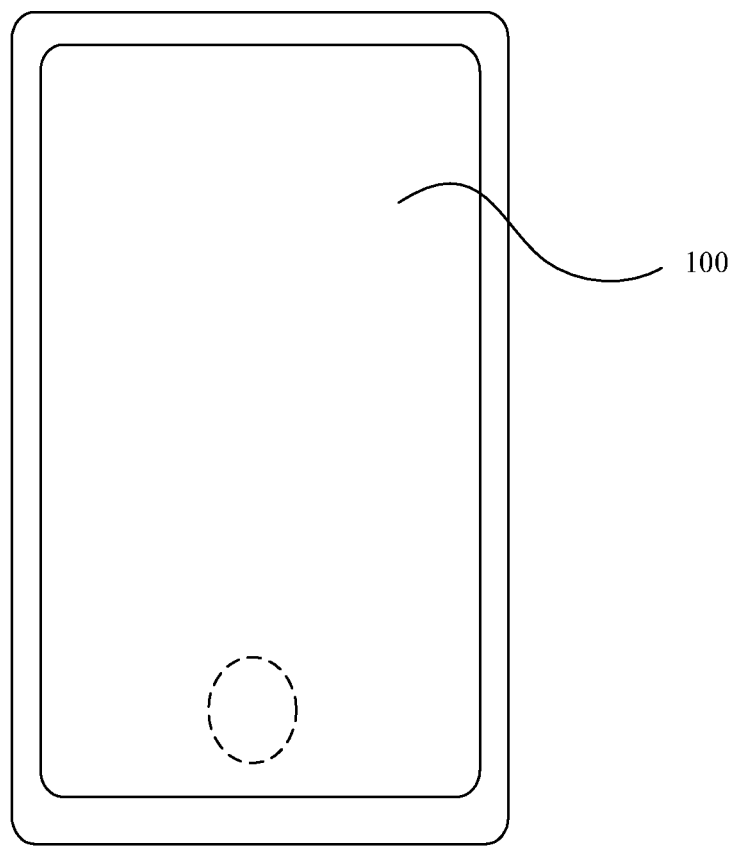
FIG. 9 is a schematic structural diagram of a display apparatus according to an embodiment of this application.

As shown in FIG. 9, an embodiment of this application further provides a display apparatus, including the display screen 100 according to any one of the foregoing. When display of the display screen 100 is viewed, because a disposed light guide member transmits a light ray emitted by a first light source to a transmission light path, a brightness difference between a region corresponding to an optical device and another region on the display screen 100 is reduced, thereby further improving a display effect of the display screen 100.

Figure 10:
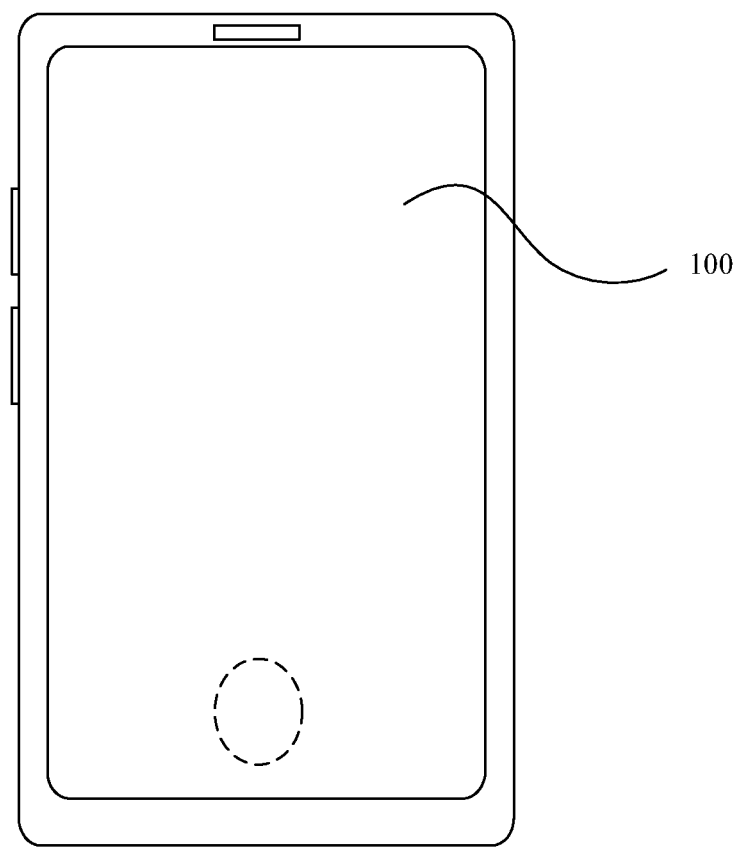
FIG. 10 is a schematic structural diagram of a terminal according to an embodiment of this application.

As shown in FIG. 10, an embodiment of this application further provides a terminal, including the display screen 100 according to any one of the foregoing. When display of the display screen 100 is viewed, because a disposed light guide member transmits a light ray emitted by a first light source to a transmission light path, a brightness difference between a region corresponding to an optical device and another region on the display screen 100 is reduced, thereby further improving a display effect of the display screen 100.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display screen comprising:
a back light system comprising:
a light emitting side; and
a first side;
a display panel disposed on the light emitting side, wherein the first side is located away from the display panel;
a fill-in light system disposed on the first side and comprising:
a second side located away from the back light system;
a first light source configured to emit a first light ray; and
a light guide member configured to transmit the first light ray; and
an optical device disposed located on the second side and configured to receive a second light ray or to emit the second light ray to form a transmission light path that passes through the display panel, the back light system, and the light guide member, wherein the light guide member further configured to transmit the first light ray to the transmission light path.

2. The display screen of claim 1, wherein the light guide member is a flat lens, a condensing lens, or a diffusing lens.

3. The display screen of claim 1, wherein the light guide member is a Fresnel lens.

4. The display screen of claim 3, wherein the Fresnel lens comprises:
a first surface facing the back light system; and
a second surface located away from the back light system, wherein either the first surface is a Fresnel refraction surface, or both the first surface and the second surface are Fresnel refraction surfaces.

5. The display screen of claim 4, wherein the Fresnel refraction surface comprises a plurality of concentric circular grooves.

6. The display screen of claim 4, wherein the Fresnel refraction surface comprises a plurality of straight grooves arranged in parallel.

7. The display screen of claim 2, wherein the light guide member comprises a third side facing the back light system, wherein the third side comprises a third surface, and wherein the display screen further comprises a plurality of triangular protrusions disposed on the third surface.

8. The display screen of claim 1, wherein the light guide member comprises a fourth side located away from the back light system, wherein the fill-in light system further comprises a film layer disposed on the fourth side, and wherein the film layer is configured to:
transmit the second light ray; and
reflect the first light ray.

9. The display screen of claim 8, wherein the fill-in light system further comprises a first reflection layer disposed on the fourth side, wherein the first reflection layer comprises a first through hole, wherein the film layer is disposed inside the first through hole, and wherein the transmission light path passes through the first through hole and the film layer.

10. The display screen of claim 9, wherein the back light system further comprises:
a light guide plate comprising:
a fifth side; and
a sixth side located away from the display panel;
a second light source disposed on the fifth side; and
a second reflection layer disposed on the sixth side and comprising a second through hole, wherein the transmission light path passes through the light guide plate and the second through hole.

11. The display screen of claim 10, wherein the light guide member and the light guide plate are coupled to be a first integral structure, wherein the first light source and the second light source are coupled to be a second integral structure, and wherein the second reflection layer and the first reflection layer are coupled to be a third integral structure.

12. The display screen of claim 1, further comprising two first light sources symmetrically disposed on two sides of the light guide member.

13. A fill-in light unit system comprising:
a light source configured to emit a first light ray; and
a light guide member comprising a light emitting surface configured to face a back light system of a display screen, wherein the light guide member is configured to transmit the first light ray to a transmission light path that passes through the back light system and the light guide member.

14. The fill-in light system of claim 13, wherein the light guide member is a flat lens, a condensing lens, or a diffusing lens.

15. The fill-in light system of claim 14, wherein the light guide member is a Fresnel lens.

16. The fill-in light system of claim 15, wherein the Fresnel lens comprises:
a first surface facing the back light system; and
a second surface located away from the back light system, wherein either the first surface is a Fresnel refraction surface, or both the first surface and the second surface are Fresnel refraction surfaces.

17. The fill-in light system of claim 13, wherein the light guide member further comprises a first side that is away from the back light system, wherein the fill-in light system further comprises a film layer disposed on the first side, and wherein the film layer is configured to:
transmit a second light ray that is received light or emitted light of an optical device of the back light system; and
reflect the first light ray.

18. The fill-in light system of claim 17, further comprising a first reflection layer disposed on the first side, wherein the first reflection layer comprises a first through hole, and wherein the film layer is disposed inside the first through hole.

19. The fill-in light system of claim 13, further comprising two light sources symmetrically disposed on two sides of the light guide member.

20. A terminal comprising:
a display screen comprising:
a back light system comprising:
a light emitting side; and
a first side;
a display panel disposed on the light emitting side,
wherein the first side is located away from the display panel;
a fill-in light system disposed on the first side and comprising:
a second side located away from the back light system;
a first light source configured to emit a first light ray; and
a light guide member configured to transmit the first light ray; and
an optical device disposed located on the second side and configured to receive a second light ray or to emit the second light ray to form a transmission light path that passes through the display panel, the back light system, and the light guide member, wherein the light guide member further configured to transmit the first light ray to the transmission light path.

\* \* \* \* \*